(12) United States Patent
Anderson et al.

(10) Patent No.: US 9,424,543 B2
(45) Date of Patent: Aug. 23, 2016

(54) AUTHENTICATING A RESPONSE TO A CHANGE REQUEST

(71) Applicant: International Business Machines Corporation, Armonk, NY (US)

(72) Inventors: Eric Anderson, Friendswood, TX (US); Christopher J. Dawson, Arlington, VA (US); Ravi K. Kosaraju, Pittsford, NY (US); Rajesh Radhakrishnan, Reston, VA (US)

(73) Assignee: International Business Machines Corporation, Armonk, NY (US)

( * ) Notice: Subject to any disclaimer, the term of this patent is extended or adjusted under 35 U.S.C. 154(b) by 293 days.

(21) Appl. No.: 13/628,176

(22) Filed: Sep. 27, 2012

(65) Prior Publication Data

US 2014/0089025 A1    Mar. 27, 2014

(51) Int. Cl.

| G06Q 10/00 | (2012.01) |
| G06F 21/00 | (2013.01) |
| G06Q 10/06 | (2012.01) |
| G06F 21/62 | (2013.01) |
| G06F 21/31 | (2013.01) |
| G06F 21/44 | (2013.01) |

(52) U.S. Cl.
CPC ............... *G06Q 10/06* (2013.01); *G06F 21/00* (2013.01); *G06F 21/31* (2013.01); *G06F 21/44* (2013.01); *G06F 21/62* (2013.01); *G06Q 2220/10* (2013.01)

(58) Field of Classification Search
CPC ..................... H04L 63/067; H04L 63/0471
USPC ........................................................ 705/51
See application file for complete search history.

(56) References Cited

U.S. PATENT DOCUMENTS

| 5,923,756 | A  | * | 7/1999  | Shambroom ................. 713/156 |
| 5,963,915 | A  | * | 10/1999 | Kirsch ......................... 705/26.8 |
| 6,226,750 | B1 | * | 5/2001  | Trieger ............................ 726/3 |
| 6,360,254 | B1 | * | 3/2002  | Linden et al. ................. 709/219 |
| 6,832,202 | B1 | * | 12/2004 | Schuyler et al. ............. 705/7.26 |
| 7,237,118 | B2 |   | 6/2007  | Himberger et al. |
| 7,293,098 | B2 | * | 11/2007 | Sandhu .............. G06F 17/3089 707/999.01 |
| 7,458,096 | B2 |   | 11/2008 | Knouse et al. |
| 7,730,321 | B2 |   | 6/2010  | Gasparini et al. |
| 8,650,405 | B1 | * | 2/2014  | Dotan et al. ................. 713/182 |

(Continued)

FOREIGN PATENT DOCUMENTS

| EP | 588415 A1 | * | 3/1994 |
| JP | 2003009243 A | * | 1/2003 |

OTHER PUBLICATIONS

Pradnya B. Rane, Pallavi Kulkarni, Suchita Patil, Dr. B.B. Meshram; "Authentication and Authorization: Tool for E-Commerce Security"; IRACST, 2012; ESTIJ, vol. 2, No. 1; pp. 150-157.*

(Continued)

*Primary Examiner* — Jonathan G Sterrett
*Assistant Examiner* — Abhijit B Sadananda
(74) *Attorney, Agent, or Firm* — Maeve Carpenter (57) ABSTRACT

A method to authenticate an identity of a responder. The method includes receiving a request and determining, by one or more computer processors, a reviewer for the request. A custom key is generated for the reviewer and the request, and at least one URL is generated that contains the custom key. At least one URL is sent, along with the request, to the reviewer. Upon receiving a response to the request that includes a selection of one URL, it is determined whether the response was received from the determined reviewer for the request.

6 Claims, 3 Drawing Sheets

(56) References Cited

U.S. PATENT DOCUMENTS

| | | | |
|---|---|---|---|
| 8,892,647 B1* | 11/2014 | Koulomzin | 709/204 |
| 2003/0196087 A1* | 10/2003 | Stringer et al. | 713/171 |
| 2004/0117663 A1* | 6/2004 | Colvin | 713/202 |
| 2006/0195347 A1* | 8/2006 | Bultmeyer et al. | 705/8 |
| 2007/0240202 A1* | 10/2007 | Sullivan et al. | 726/4 |
| 2008/0120711 A1 | 5/2008 | Dispensa | |
| 2012/0011576 A1 | 1/2012 | Guan et al. | |
| 2012/0124646 A1 | 5/2012 | Lin | |

OTHER PUBLICATIONS

N. Asokan, Herve Debar, Michael Steiner, Michael Waidner; "Authenticating Public Terminals"; Elsevier Science, 1999; Computer Networks, vol. 31; pp. 861-870.*

E. Hammer-Lahav; "The OAuth 1.0 Protocol"; Internet Engineering Task Force, Apr. 2010; pp. 1-38.*

* cited by examiner

AUTHENTICATING A RESPONSE TO A CHANGE REQUEST

FIELD OF THE INVENTION

The present invention relates generally to the field of change management, and more particularly to authenticating a response to a change request.

BACKGROUND

Change management is a project management process where changes to a project are formally introduced and approved or rejected. The objective of change management is to ensure that standardized methods and procedures are used for efficient and prompt handling of all changes to control IT infrastructure, in order to minimize the number and impact of any related incidents upon service. Change management can ensure standardized methods, processes and procedures which are used for all changes, facilitate efficient and prompt handling of all changes, and maintain the proper balance between the need for change and the potential detrimental impact of changes.

A change is an event that is approved by management, implemented with a minimized and accepted risk to existing IT infrastructure, and provides increased value to the business from the use of the new or enhanced IT systems. A change request is a document containing a call for a change. Change requests typically originate from one of five sources: problem reports that identify bugs that must be fixed, system enhancement requests from users, events in the development of other systems, changes in underlying structure and/or standards, and demands from senior management. An important attribute of change requests is the "approve or reject" decision. Any proposed change must be approved in the change management process before any change can be carried out.

SUMMARY

Embodiments of the present invention provide a method, computer system, and computer program product to authenticate an identity of a responder. The method includes receiving a request for a change to a project and determining, by one or more computer processors, a reviewer for the request. The method includes generating a custom key for the reviewer and the request, and generating at least one Uniform Resource Locator (URL) containing the custom key. The method includes sending the at least one URL and the request to the reviewer. The method includes receiving a response to the request that includes a selection of one of the at least one URLs. The method further includes determining, by one or more computer processors, the response was received from the reviewer determined for the request.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
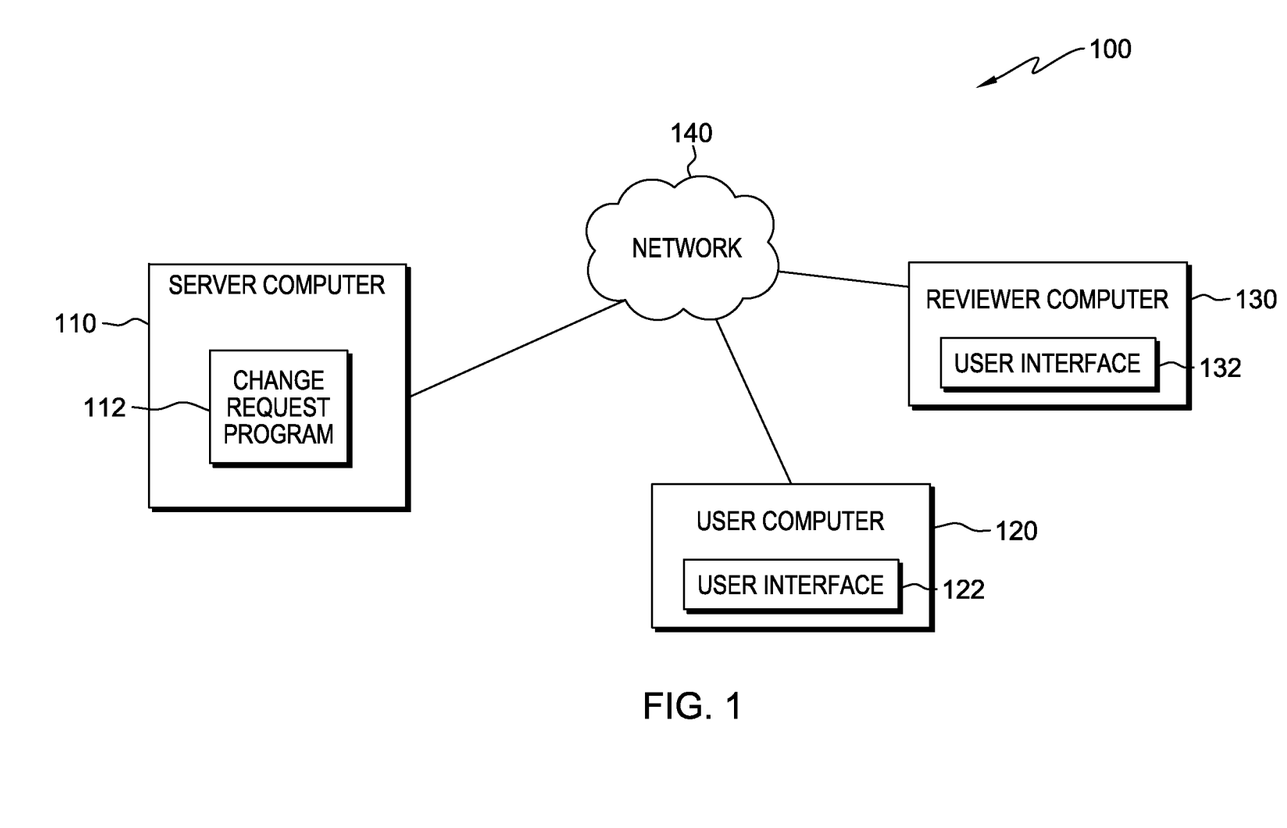
FIG. 1 is a functional block diagram illustrating a change management environment, in accordance with an embodiment of the present invention.

Embodiments of the present invention will now be described in detail with reference to the accompanying drawings. FIG. 1 is a functional block diagram illustrating a change management environment, generally designated 100, in accordance with an embodiment of the present invention.

Change management environment 100 includes server computer 110, user computer 120 and reviewer computer 130, all interconnected over network 140.

Server computer 110 may be a laptop computer, tablet computer, netbook computer, personal computer (PC), a desktop computer, a personal digital assistant (PDA), a smart phone, or any programmable electronic device capable of communicating with user computer 120 and reviewer computer 130 via network 140. Server computer 110 includes change request program 112 for identifying and authenticating change request reviewers and verifying that change request selections are made by the identified change request reviewers.

User computer 120 and reviewer computer 130 may be laptop computers, tablet computers, netbook computers, personal computers (PC), desktop computers, personal digital assistants (PDA), smart phones or any programmable devices capable of communication with each other and with server computer 110 via network 140. User computer 120 includes user interface (UI) 122 and reviewer computer 130 includes UI 132. UI 122 and UI 132 each provide an interface that can display text and user options to an operator of user computer 120 and reviewer computer 130, respectively. UI 122 and UI 132 may each be, for example, a web user interface (WUI) or a graphical user interface (GUI).

Network 140 can be, for example, a local area network (LAN), a wide area network (WAN) such as the Internet, or a combination of the two, and can include wired, wireless, or fiber optic connections. In general, network 140 can be any combination of connections and protocols that will support communications between server computer 110, user computer 120 and reviewer computer 130.

Change request program 112 identifies change request reviewers for change requests received from a user of user computer 120 and generates one time use custom approval keys that are unique for the identified reviewer and the received change request. Change request reviewers may be management, executives, or any other person within change management environment 100 with pre-authorization for change request review. Change request program 112 generates approval and rejection Uniform Resource Locators (URLs) that include the custom approval key for the identified reviewer and change request. The generated URLs are sent to the identified reviewers' pre-authorized computing device, for example, reviewer computer 130. Upon receiving a response selecting either the approval or the rejection URL, change request program 112 determines whether the approval key included in the selected URL exists and matches the identified reviewer for the received change request. Change request program 112 determines whether the URL selection was received from one of the identified reviewers pre-authorized computing devices.

Figure 2:
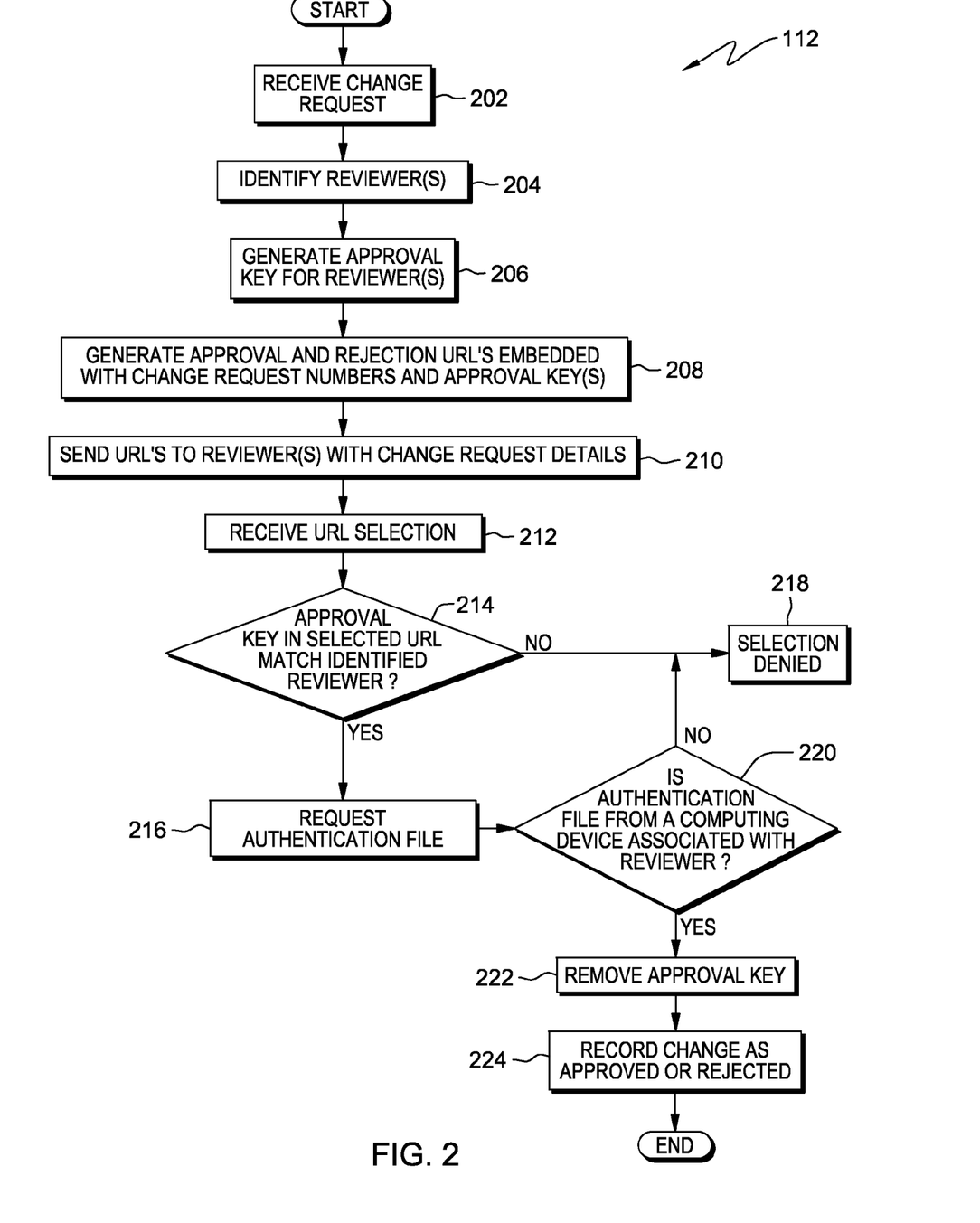
FIG. 2 is a flowchart depicting operational steps of the change request program of FIG. 1, in accordance with an embodiment of the present invention.

FIG. 2 is a flowchart depicting operational steps of the change request program of FIG. 1 for identifying and authenticating change request reviewers and verifying that change request selections are made by the identified change request reviewers, in accordance with an embodiment of the present invention.

Change request program 112 receives a change request (step 202). Change requests are sent by a user of user computer 120 and may include details such as requester identification, change type, and change description. Each change request includes an option for a reviewer to approve or reject the requested change.

Change request program 112 identifies reviewers for the received change request (step 204), based on the details of the change request, for example, the type of change or the department to which the change request may apply. Identified reviewers are pre-authorized to review change requests and may be an individual or a team.

Change request program 112 generates approval keys for the identified reviewers (step 206). In the case of a team, an approval key is generated for each reviewer. The generated approval keys are customized for each identified reviewer so the approval key may be matched to the identified reviewer for the received change request in order to verify change request selections. Generated approval keys may be, for example, a series of numbers and letters unique to the identified reviewer.

Change request program 112 generates approval and rejection Uniform Resource Locators (URLs) embedded with both change request numbers and approval keys (step 208). The URLs are distinct for each reviewer and change request. When the identified reviewers include a team, distinct URLs are generated for each reviewer on the team that include each reviewer's custom approval key.

Change request program 112 sends the approval and rejection URLs, via network 140, to each identified reviewer with the details of the received change request (step 210). The details, for example, change type and description, provide the reviewer with information necessary to decide whether to approve or reject the requested change. In a preferred embodiment of the present invention, the approval and rejection URLs and the change request details are sent to the identified reviewers in an email message.

Change request program 112 receives a URL selection (step 212). The selection may be either an approval of the change or a rejection of the change request, based on which of the sent URLs is chosen. In an embodiment of the present invention, for example, if an approval URL is selected, the relevant data included in the URL, e.g. the generated approval key and the change request number, is processed by and transmitted to a server computer, for example, server computer 110.

Change request program 112 determines whether the approval key in the selected URL matches the identified reviewer (decision block 214). If the approval key in the selected URL does not match the identified reviewer (decision block 214, no branch), the selection is denied (step 218). If the approval key in the selected URL does correspond to the identified reviewer (decision block 214, yes branch), change request program 112 requests an authentication file (step 216). Each reviewer's computing device in change management environment 100, for example, reviewer computer 130, is pre-authorized and known to be used by a specific reviewer. The authentication file for verification of an authorized device may be, for example, an encrypted browser cookie. When a reviewer logs in to a computing device within change management environment 100, an encrypted file can be created and stored on the device, which allows the computing device to be associated with and pre-authorized for that reviewer. A reviewer may have more than one computing device pre-authorized within change management environment 100.

Change request program 112 determines whether the authentication file received from a computing device is associated with the identified reviewer (decision block 220). If the authentication file does not match one of the identified reviewer's computing devices (decision block 220, no branch), the selection is denied (step 218). Denial may occur, for example, if the identified reviewer has opened a message with the sent URL on another person's computing device.

If the authentication file received does match one of the identified reviewer's computing devices (decision block 220, yes branch), the approval key in the selected URL is removed from the change management system (step 222). Approval keys are removed to ensure that the URL sent to an identified reviewer cannot be manipulated for future change requests and used again. When a URL selection received from a reviewer on a team is authenticated, the remaining approval keys generated for that team are removed. Only one reviewer on a team may approve or reject a change. Change request program 112 records the change as either approved or rejected (step 224).

Figure 3:
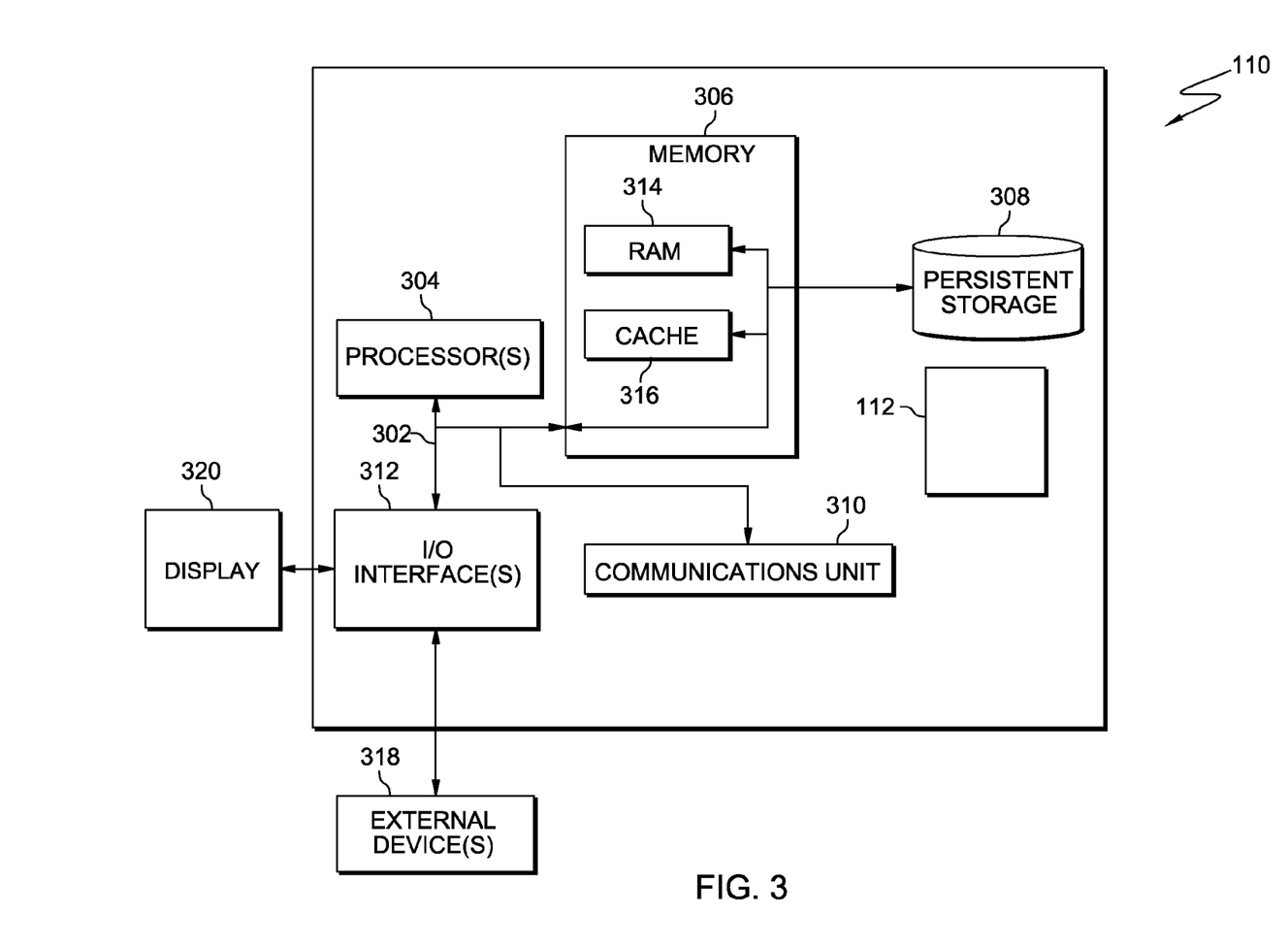
FIG. 3 depicts a block diagram of components of the server computer of FIG. 1, in accordance with an embodiment of the present invention.

FIG. 3 depicts a block diagram of components of server computer 110, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Server computer 110 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Change request program 112 is stored in persistent storage 308 for execution by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including user computer 120 and reviewer computer 130. In these examples, communications unit 310 includes one or more network interface cards. Communications unit 310 may provide communications through the use of either or both physical and wireless communications links. Change request program 112 may be downloaded to persistent storage 308 through communications unit 310.

I/O interface(s) 312 allows for input and output of data with other devices that may be connected to server computer 110. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., change request program 112, can be stored on such portable computer-readable storage media and can be loaded onto persistent storage 308 via I/O interface(s) 312. I/O interface(s) 312 also connect to a display 320. Display 320 provides a mechanism to display data to a user and may be, for example, a computer monitor or an incorporated display screen, such as is used in table computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowcharts and block diagrams in the Figures illustrate the architecture, functionality, and operations of possible implementations of systems, methods, and computer program products according to various embodiments of the present invention. However, numerous modifications and substitutions can be made without deviating from the scope of the present invention. Such modifications and substitutions that may be apparent to a person skilled in the art of the invention are intended to be included within the scope of the invention as defined by the accompanying claims. In this regard, each block in the flowcharts or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. The foregoing description is not intended to be exhaustive nor to limit the invention to the precise form disclosed. Therefore, the present invention has been disclosed by way of example and not limitation.

What is claimed is:

1. A method executable by a central processing unit (CPU) for authenticating an identity of a reviewer to improve security and authentication when operating over a network to perform a change management task, the method comprising the steps of:
  receiving, by one or more computer processors, a request for a change to a project in a change management system;
  determining, by the one or more computer processors, at least one reviewer for the request;
  generating, by the one or more computer processors, a custom key for the at least one reviewer and the request, wherein the custom key includes one or more unique identifiers for the at least one reviewer;
  generating, by the one or more computer processors, at least two Uniform Resource Locators (URLs) embedded with both the custom key for the at least one reviewer and a change request number for the request, wherein the at least two URLs include an approval URL and a rejection URL;
  sending, by the one or more computer processors, the at least two URLs and a plurality of change request details for the request to the at least one reviewer;
  receiving, by the one or more computer processors, a response to the request, wherein the response includes a selection of one of the at least two URLs;
  determining, by the one or more computer processors, the response was received from the at least one reviewer determined for the request, wherein determining the response was received from the reviewer determined for the request includes:
    determining, by the one or more computer processors, whether a selected URL in the received response contains a custom key matching the custom key generated for the at least one reviewer and the request; and
    responsive to a determination that the selected URL in the received response contains a custom key matching the custom key generated for the at least one reviewer and the request, determining, by the one or more computer processors, the response was received from at least one pre-authorized computing device of the at least one reviewer, wherein determining the response was received from the at least one pre-authorized computing device of the at least one reviewer includes:
      requesting, by the one or more computer processors, an authentication file for verification of the at least one pre-authorized computing device of the at least one reviewer, wherein the authentication file is an encrypted browser cookie;
    creating, by the one or more computer processors, the authentication file on the at least one pre-authorized computing device when the at least one reviewer logs into the at least one pre-authorized computing device;
    storing, by the one or more computer processors, the authentication file on the at least one pre-authorized computing device of the at least one reviewer; and
    determining, by the one or more computer processors, whether the authentication file from the at least one pre-authorized computing device is associated with the at least one reviewer;
  responsive to a determination that the authentication file received from the at least one pre-authorized computing device is not associated with the at least one reviewer, denying, by the one or more computer processors, the request, wherein denying includes rejecting processing of the change to the project and removing the custom key in the at least two URLs sent to the at least one pre-authorized computing device of the at least one reviewer from the change management system; and
  responsive to a determination that the authentication file received from the at least one pre-authorized computing device is associated with the at least one reviewer, accepting, by the one or more computer processors, the request, wherein accepting includes approving processing of the change to the project and removing the custom key in the at least two URLs sent to the at least one pre-authorized computing device of the at least one reviewer from the change management system.

2. The method of claim 1, wherein the step of the one or more processors determining at least one reviewer for the change request comprises determining a team of reviewers for the request.

3. A computer program product executable by a central processing unit (CPU) for authenticating an identity of a reviewer to improve security and authentication when operating over a network to perform a change management task, the computer program product comprising:
  one or more computer-readable storage devices and program instructions stored on at least one of the one or more computer-readable storage devices, the program instructions comprising:
  program instructions to receive, by one or more computer processors, a request for a change to a project in a change management system;
  program instructions to determine, by the one or more computer processors, at least one reviewer for the request;
  program instructions to generate, by the one or more computer processors, a custom key for the at least one reviewer and the request, wherein the custom key includes one or more unique identifiers for the at least one reviewer;
  program instructions to generate, by the one or more computer processors, at least two Uniform Resource Locators (URLs) embedded with both the custom key for the at least one reviewer and a change request number for the request, wherein the at least two URLs include an approval URL and a rejection URL;
  program instructions to send, by the one or more computer processors, the at least two URLs and a plurality of change request details for the request to the at least one reviewer;
  program instructions to receive, by the one or more computer processors, a response to the request, wherein the response includes a selection of one of the at least two URLs;

program instructions to determine, by the one or more computer processors, the response was received from the at least one reviewer determined for the request, wherein determining the response was received from the reviewer determined for the request includes:
  program instructions to determine, by the one or more computer processors, whether a selected URL in the received response contains a custom key matching the custom key generated for the at least one reviewer and the request; and
  responsive to a determination that the selected URL in the received response contains a custom key matching the custom key generated for the at least one reviewer and the request, program instructions to determine, by the one or more computer processors, the response was received from at least one pre-authorized computing device of the at least one reviewer, wherein determining the response was received from the at least one pre-authorized computing device of the at least one reviewer includes:
    program instructions to request, by the one or more computer processors, an authentication file for verification of the at least one pre-authorized computing device of the at least one reviewer, wherein the authentication file is an encrypted browser cookie;
    program instructions to create, by the one or more computer processors, the authentication file on the at least one pre-authorized computing device when the at least one reviewer logs into the at least one pre-authorized computing device;
    program instructions to store, by the one or more computer processors, the authentication file on the at least one pre-authorized computing device of the at least one reviewer; and
    program instructions to determine, by the one or more computer processors, whether the authentication file from the at least one pre-authorized computing device is associated with the at least one reviewer;
  responsive to a determination that the authentication file received from the at least one pre-authorized computing device is not associated with the at least one reviewer, program instructions to deny, by the one or more computer processors, the request, wherein denying includes rejecting processing of the change to the project and removing the custom key in the at least two URLs sent to the at least one pre-authorized computing device of the at least one reviewer from the change management system; and
  responsive to a determination that the authentication file received from the at least one pre-authorized computing device is associated with the at least one reviewer, program instructions to accept, by the one or more computer processors, the request, wherein accepting includes approving processing of the change to the project and removing the custom key in the at least two URLs sent to the at least one pre-authorized computing device of the at least one reviewer from the change management system.

4. The computer program product of claim 3, wherein the program instructions to determine at least one reviewer for the change request comprise program instructions to determine a team of reviewers for the request.

5. A computer system executable by a central processing unit (CPU) for authenticating an identity of a reviewer to improve security and authentication when operating over a network to perform a change management task, the computer program product comprising:
  one or more processors, one or more computer-readable memories, one or more computer-readable tangible storage devices, and program instructions stored on at least one of the one or more tangible storage devices for execution by at least one of the one or more processors via at least one of the one or more memories, the program instructions comprising:
  program instructions to receive, by the one or more computer processors, a request for a change to a project in a change management system;
  program instructions to determine, by the one or more computer processors, at least one reviewer for the request;
  program instructions to generate, by the one or more computer processors, a custom key for the at least one reviewer and the request, wherein the custom key includes one or more unique identifiers for the at least one reviewer;
  program instructions to generate, by the one or more computer processors, at least two Uniform Resource Locators (URLs) embedded with both the custom key for the at least one reviewer and a change request number for the request, wherein the at least two URLs include an approval URL and a rejection URL;
  program instructions to send, by the one or more computer processors, the at least two URLs and a plurality of change request details for the request to the at least one reviewer;
  program instructions to receive, by the one or more computer processors, a response to the request, wherein the response includes a selection of one of the at least two URLs;
  program instructions to determine, by the one or more computer processors, the response was received from the at least one reviewer determined for the request, wherein determining the response was received from the reviewer determined for the request includes:
    program instructions to determine, by the one or more computer processors, whether a selected URL in the received response contains a custom key matching the custom key generated for the at least one reviewer and the request; and
    responsive to a determination that the selected URL in the received response contains a custom key matching the custom key generated for the at least one reviewer and the request, program instructions to determine, by the one or more computer processors, the response was received from at least one pre-authorized computing device of the at least one reviewer, wherein determining the response was received from the at least one pre-authorized computing device of the at least one reviewer includes:
      program instructions to request, by the one or more computer processors, an authentication file for verification of the at least one pre-authorized computing device of the at least one reviewer, wherein the authentication file is an encrypted browser cookie;
      program instructions to create, by the one or more computer processors, the authentication file on the at least one pre-authorized computing device when the at least one reviewer logs into the at least one pre-authorized computing device;

program instructions to store, by the one or more computer processors, the authentication file on the at least one pre-authorized computing device of the at least one reviewer; and program instructions to determine, by the one or more computer processors, whether the authentication file from the at least one pre-authorized computing device is associated with the at least one reviewer;

responsive to a determination that the authentication file received from the at least one pre-authorized computing device is not associated with the at least one reviewer, program instructions to deny, by the one or more computer processors, the request, wherein denying includes rejecting processing of the change to the project and removing the custom key in the at least two URLs sent to the at least one pre-authorized computing device of the at least one reviewer from the change management system; and responsive to a determination that the authentication file received from the at least one pre-authorized computing device is associated with the at least one reviewer, program instructions to accept, by the one or more computer processors, the request, wherein accepting includes approving processing of the change to the project and removing the custom key in the at least two URLs sent to the at least one pre-authorized computing device of the at least one reviewer from the change management system.

6. The computer system of claim 3, wherein the program instructions to determine at least one reviewer for the change request comprise program instructions to determine a team of reviewers for the request.

* * * * *